United States Patent

Lakhat et al.

[19]

[11] Patent Number: 6,154,785
[45] Date of Patent: Nov. 28, 2000

[54] INTER-PROCESSOR COMMUNICATION SYSTEM

[75] Inventors: Badruddin N. Lakhat, Mountain View; Kothandapani Ranganathan, Sunnyvale, both of Calif.

[73] Assignee: Network Equipment Technologies, Inc., Fremont, Calif.

[21] Appl. No.: 09/118,578

[22] Filed: Jul. 17, 1998

[51] Int. Cl.[7] ............................................. G06F 15/163
[52] U.S. Cl. ............................................. 709/310; 709/234
[58] Field of Search ........................... 710/100; 709/300, 709/310, 234

[56] References Cited

U.S. PATENT DOCUMENTS

| | | | |
|---|---|---|---|
| 4,926,419 | 5/1990 | Whipple | 370/447 |
| 5,652,905 | 7/1997 | Shinjo et al. | 709/234 |
| 5,706,514 | 1/1998 | Bonola | 709/104 |

*Primary Examiner*—Kenneth R. Coulter
*Attorney, Agent, or Firm*—Crosby, Heafey, Roach & May

[57] ABSTRACT

An inter-processor communication system for a multi-processor environment wherein each processor has an associated processor system controller comprising an inter-processor communication registers (IPC Comm Reg). The IPC Comm Reg further comprising a response command register (CMD1 Reg), a non-response command register (CMD2 Reg), and a response register (RSP Reg). During inter-processor communication, the IPC Comm Reg of an initiating processor is coupled to the IPC Comm Reg of a target processor via the IPC bus so that data can be transmitted and one or more of a set of control flags of the target IPC Comm Reg is cleared or set in response to a write or read operation. In the inter-processor communication method for communication between multiple processors the initiating processor system controller coupled to an initiating processor detects the state of a set of status control flags of an initiating IPC Comm Reg associated with that initiating processor. In response to the detected state of the set of status control flags, the initiating system controller writes data to a remote target IPC Comm Reg of a remote target processor system controller, and also sets an associated interrupt flag in the target IPC Comm Reg in response to that write operation. The target system controller then detects the set interrupt flag in the target IPC Comm Reg, and in response thereto, reads data from the target IPC Comm Reg. Moreover, the initiating and/or target system controller may perform additional command sequence depending on the communication mode selected, i.e., auto-response method, CPU-response method, or non-response method.

16 Claims, 7 Drawing Sheets

IPC REGISTERS

| REGISTER NAME | BITS | DESCRIPTION | WRITE | READ |
|---|---|---|---|---|
| Response Command (Little Endian) | <31> | 0 - Auto Response Command<br>1 - CPU Response Command | remote | local |
|  | <30-0> | Software defined | remote | local |
| (Big Endian) | <7> | 0 - Auto Response Command<br>1 - CPU Response Command | remote | local |
|  | <31-8> | Software defined | remote | local |
|  | <6-0> | Software defined | remote | local |
| Non-Response Command 1 | <31-0> | Software defined | remote | local |
| Non-Response Command 2 | <31-0> | Software defined | remote | local |
| Response | <31-0> | Software defined | remote | local |
| Response Data | <31-0> | Software defined | local | local |
| Control & Status | <8-31> | Not defined | none | local |
|  | <7> | IE Bit for Non-Response Command 2 Register | local | local |
|  | <6> | Flg Bit for Non-Response 2 Command Register | none | local |
|  | <5> | IE Bit for Response Register | local | local |
|  | <4> | IE Bit for Non-Response Command 1 Register | local | local |
|  | <3> | IE Bit for Response Command Register | local | local |
|  | <2> | Flg Bit for Response Register | none | local |
|  | <1> | Flg Bit for Non-Response Command 1 Register | none | local |
|  | <0> | Flg Bit for Response Command Register | none | local |
|  |  | All IE Bit: 0 = interrupt disable<br>1 = interrupt enable<br>All Flg Bit Bits: 0 = clear<br>1 = set |  |  |

FIG. 4

NMP TO RP AUTO RESPONSE COMMAND

| Initiator (NMP) | Target (RP) |
|---|---|
| 1. Initialize: | 1. Initialize: Response Data Register (0XAABBCCDD) |
| 2. Read IPC-Status Register<br>if (CMD1 Flg clear AND Rsp Flg Clear) then<br>begin<br>3. write to remote Response Cmd Reg<br>(CMD 1 Reg) with data of (0X7F00FF00) ------> | 4. wait for (interrupt OR CMD1 Flg set)<br>5. read local Responsive Cmd Reg (CMD1 Reg) with expected data of (0X7F00FF00)<br>if (Bit 31 = 0 for Little Endian OR Bit 7 = 0 for Big Endian) then<br>  command is auto-response command<br>endif<br>if (CMD1 Reg is read AND Auto-Response Command) then<br>6. RP SYSC sends write to remote Response Reg (RSP Reg) with data from Response Data Reg of (0XAABBCCDD)<br>endif   <------ |
| 7. wait for (interrupt OR RSP Flg Set)<br>8. read local response reg (RSP Reg) with the expected data of (0XAABBCCDD)<br>end<br>else<br>9. wait for (CMD1 Flg AND RSP Flg to clear)<br>end if | |

FIG. 5

NMP TO RP CPU RESPONSE COMMAND

| Initiator (NMP) | Target (RP) |
|---|---|
| 1. Initialize: | 1. Initialize: |
| 2. Read IPC-Status Register<br>if (CMD1 Flg clear AND Rsp Flg Clear) then<br>begin<br>3. write to remote Response Cmd Reg (CMD 1 Reg) with data of (0X7F00FF00) ------> | 4. wait for (interrupt OR CMD1 Flg set)<br>5. read local Responsive Cmd Reg (CMD1 Reg) with expected data of (0X7F00FF00)<br>if (Bit 31 = 1 for Little Endian OR Bit 7 = 1 for Big Endian) then<br>  command is cpu-response command<br>endif<br>if (CMD1 Reg is read AND Auto-Response Command) then<br>6. RP CPU sends write to remote Response Reg (RSP Reg) with data of (0X11223344)<br>endif <-------- |
| 7. wait for (interrupt OR RSP Flg Set)<br>8. read local response reg (RSP Reg) with the expected data of (0X11223344)<br>end<br>else<br>9. wait for (CMD1 Flg AND RSP Flg to clear)<br>end if | |

FIG. 6

NMP TO RP AUTO RESPONSE COMMAND

| Initiator (NMP) | Target (RP) |
|---|---|
| 1. Initialize: | 1. Initialize: |
| 2. Read IPC-Status Register<br>if (CMD2 Flg clear) then<br>begin<br>3. write to remote Non-Response Cmd Reg<br>(CMD 2 Reg) with data of (0X12345678)<br>---------------------------------------><br>end<br>endif | 4. wait for (interrupt OR CMD2 Flg set)<br>5. read local Non-Responsive Cmd Reg (CMD2 Reg) with expected data of (0X12345678) |

INTER-PROCESSOR COMMUNICATION SYSTEM

FIELD OF THE INVENTION

The invention relates to inter-processor communication system in a multi-processor environment.

BACKGROUND OF THE INVENTION

In prior multi-processor communication systems, each processor is the master of its own memory bus and device bus, and thus communication from one processor to either the local memory or device of another processor requires direct interaction with that other processor, thereby tying up the processing time of that processor from performing other tasks during the inter-processor communication.

In a multiprocessor system environment, there is a need for a reliable communication system between two processors to transmit information packets from one processor to another processor, or from one processor to a local memory of another processor with increased efficiency. It is also desirable to have a reliable inter-processor communication system that operates to transfer data in real-time, and as such would provide a very fast response or service time.

SUMMARY OF THE INVENTION

An inter-processor communication system for a multi-processor environment is provided wherein each processor has an associated processor system controller comprising an inter-processor communication registers (IPC Comm Reg). The IPC Comm Reg further comprises a response command register (CMD1 Reg), a non-response command register (CMD2 Reg), and a response register (RSP Reg). During inter-processor communication, the IPC Comm Reg of an initiating processor is coupled to the IPC Comm Reg of a target processor via the IPC bus so that data can be transmitted and one or more of a set of control flags of the target IPC Comm Reg is cleared or set in response to a write or read operation.

In the inter-processor communication method for communication between multiple processors, the initiating processor system controller coupled to an initiating processor detects the state of a set of status control flags of an initiating IPC Comm Reg. In response to the detected state of the set of status control flags, the initiating system controller writes data to a remote target IPC Comm Reg of a remote target processor system controller. The target system controller detects the write operation to its IPC Comm Reg and sets a write status and/or interrupt enable flag associated with the target IPC Comm Reg. The target processor then detects the set interrupt flag in the target IPC Comm Reg, and in response thereto, reads data from the target IPC Comm Reg. Moreover, the initiating and/or target system controller may perform additional command sequence depending on the communication mode selected, i.e., auto-response mode, CPU-response mode, or non-response mode.

The inter-processor communication system provided in accordance with the principles of this invention provides a reliable, real-time method of communication between the two processors to facilitate a variety of applications where it is desirable to have inter-processor communication.

DETAILED DESCRIPTION OF THE INVENTION

Figure 1:
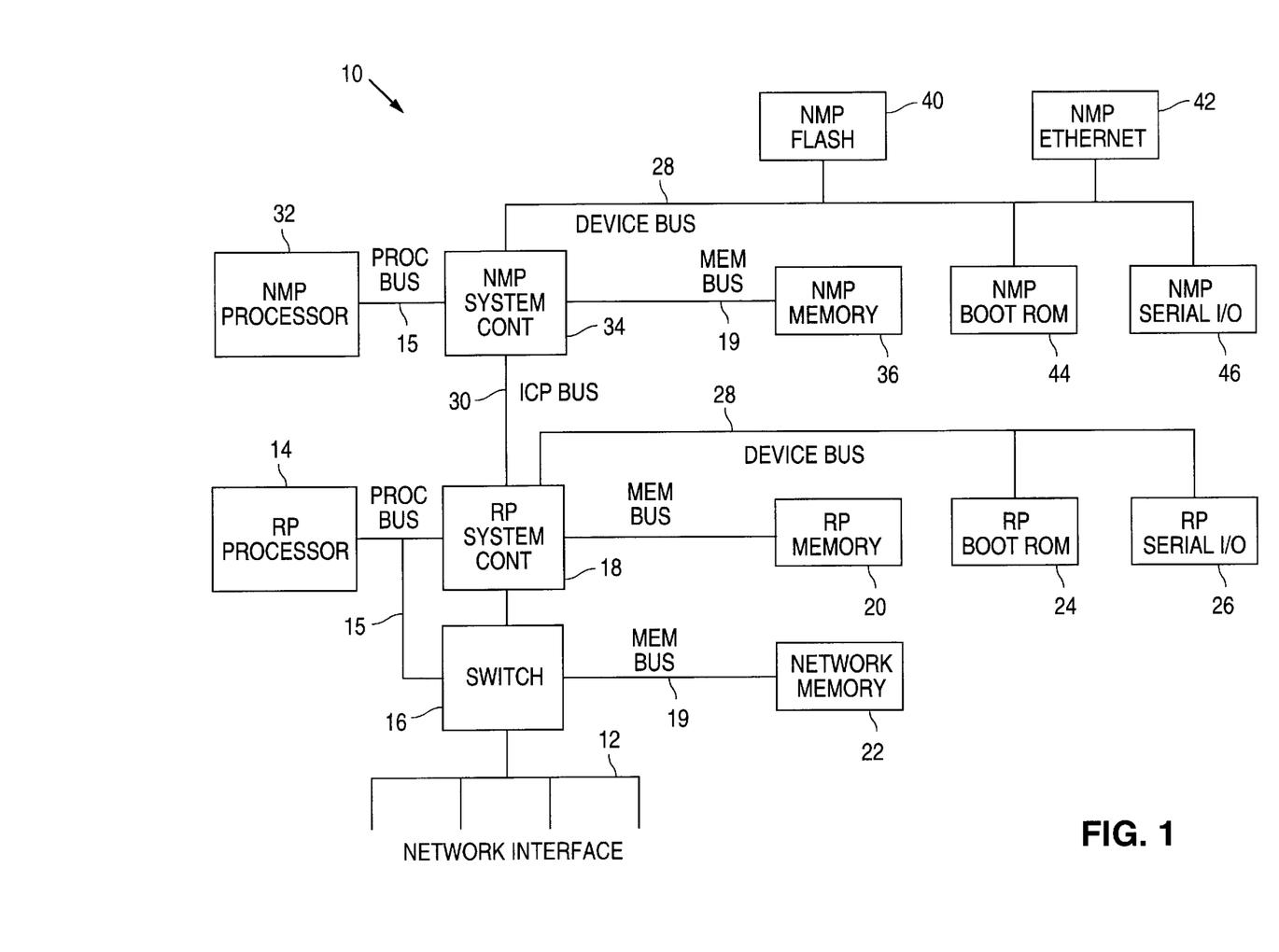
FIG. 1 illustrates a system level block diagram of an inter-processor communication system in accordance with the principles of this invention.

FIG. 1 illustrates a system level block diagram of an inter-processor communication system 10 provided in accordance with the principles of this invention. Inter-processor communication system 10 comprises of at least two processor sub-systems, a Network Management Processor) 32 and a Route Processor (RP) 14. Each processor subsystem has its associated resource environment, such as RP processor 14 coupled to a RP processor system controller 18 via a processor bus 15, system controller 18 also coupled to a RP local memory unit 20 via a memory bus 19, and to a RP boot ROM memory 24 and to a RP input/output devices (Serial I/O) 26 via device bus 28. Similarly, NMP processor 32 is coupled to a NMP processor system controller 34 via a processor bus 15, system controller 34 is also coupled to an NMP local memory unit 36 via a memory bus 19, and to an NMP boot ROM memory 44 and to a NMP input/output devices (Serial I/O) 46 via device bus 28.

The inter-processor communication system 10 provides a reliable system of communication between processors 14 and 32. During normal system operation, for example, data, or in this particular example, network packets, received through a network interface 12 by a network switch device 16 and stored in network memory 22 can be transmitted out of network memory 22 back to network interface 12. When needed, these network packets can also be sent either to RP local memory 20 or to NMP local memory 36 by either RP system controller 18 or switch 16.

In this embodiment, NMP processor 32 carries out certain network management function such as maintaining of route tables, and in these cases, NMP 32 sends certain data to both RP memory 20 and network memory 22. Moreover, during system reset conditions, such as from power-on or watchdog timer, or other soft reset condition, NMP processor 32 is able to provide certain RP processor code or data from NMP flash memory 40 to RP memory 20 via NMP and RP system controllers 34 and 18.

During normal operation, inter-processor communication system 10 further enables RP processor 14 to provide NMP processor 32 with data, and/or vice-versa, as might be required during the occurrence of certain network events.

Figure 2:
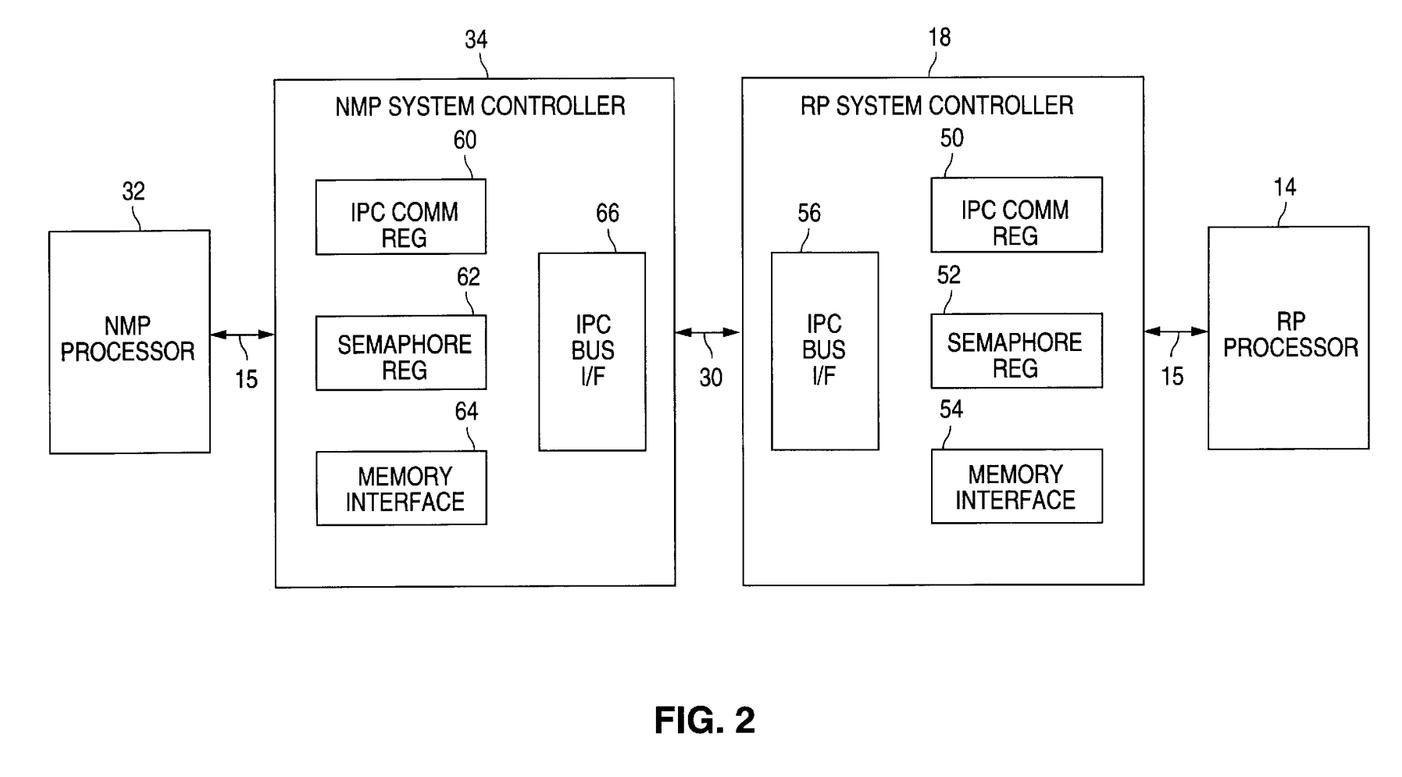
FIG. 2 illustrates a more detailed block level diagram of the processor system controllers of FIG. 1.

FIG. 2 illustrates a more detailed block diagram of the inter-processor communication (IPC) block of the processor system controllers (SYSCs) of FIG. 1. As shown in FIG. 2, the IPC block of RP system controller (RP SYSC) 18 and NMP system controller (NMP SYSC) 34 each comprises four major components: an IPC Bus Interface 56 and 66, respectively, an IPC Communication Register (IPC Comm Reg) 50 and 60, respectively, an IPC Semaphore Register 52 and 62, respectively, and an IPC Memory Interface 54 and 64, respectively. The IPC bus interface comprises typical control logic to provide read and write access between the RP IPC Comm Reg 50 and NMP IPC Comm Reg 60. The IPC Comm Reg 50 and 60 comprises registers used in communicating between the NMP and RP processors. The IPC Semaphore Register comprises the semaphore locking control and registers to provide sharing of common memory space. The IPC Memory Interface provides the memory interface and data buffers.

Figure 3:
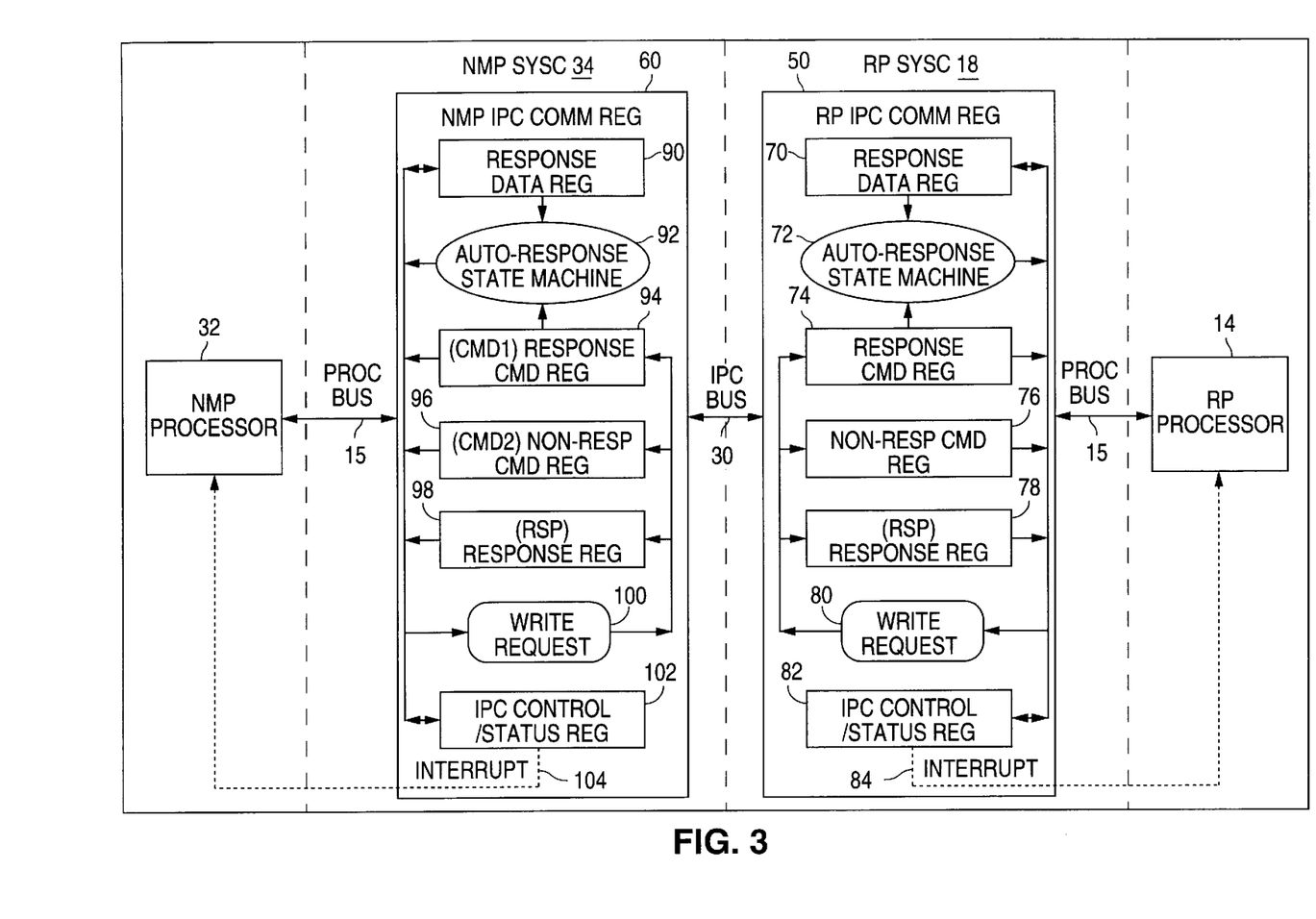
FIG. 3 illustrates a more detailed block diagram of the inter-processor communication register (IPC Comm Reg) blocks of FIG. 2.

FIG. 3 illustrates a more detailed block diagram of the IPC Comm Reg 50 and 60 of FIG. 2. IPC Comm Reg 50 and 60 each comprises the following registers: a Response Command register (CMD1 Reg) 74 and 94, respectively, a Non-Response Command register (CMD2 Reg) 76 and 96, respectively, and a Response register (RSP Reg) 78 and 98, respectively. Although FIG. 3 shows only one register for each CMD1, CMD2 and RSP Reg, each such defined register can be extended to multiple registers. The width of these registers can be varied and is implementation dependent. In this example, all registers are 32-bits wide. However, the width of these register fields can be varied and software defined to provide flexibility for adapting to different standards and allow for future system expansion. Each CMD1, CMD2 and RSP Reg has a set of register status control flags comprising an associated write status flag (flg) bit which is set when the register is written and cleared when the register is read. An interrupt enable (IE) bit is also provided for each CMD1, CMD2, and RSP Reg, which when set will send an interrupt to the associated local processor. All of these bits are controlled through an IPC Control and Status register, such as IPC Control/Status Reg 82 and the IPC Control/Status Reg 102.

Response Data registers 78 and 98 are provided for auto-response command as will be further described below in connection with auto-response command mode. CMD1, CMD2, and RSP Reg each has local-read and remote-write permissions. This thus provides read and write access such as, for example, when RP processor 14 writes to NMP system controller's (NMP SYSC) CMD1 Reg 94, NMP processor 32 is able to read NMP CMD1 Reg 94 and Status Reg 82. Both Response Data Reg 70 and 60 are locally read and write. Response data registers are provided to store data used in an auto-response mode, one of the various different modes of inter-processor communication that will be described in more detail with reference to FIGS. 5–8.

Figure 4:
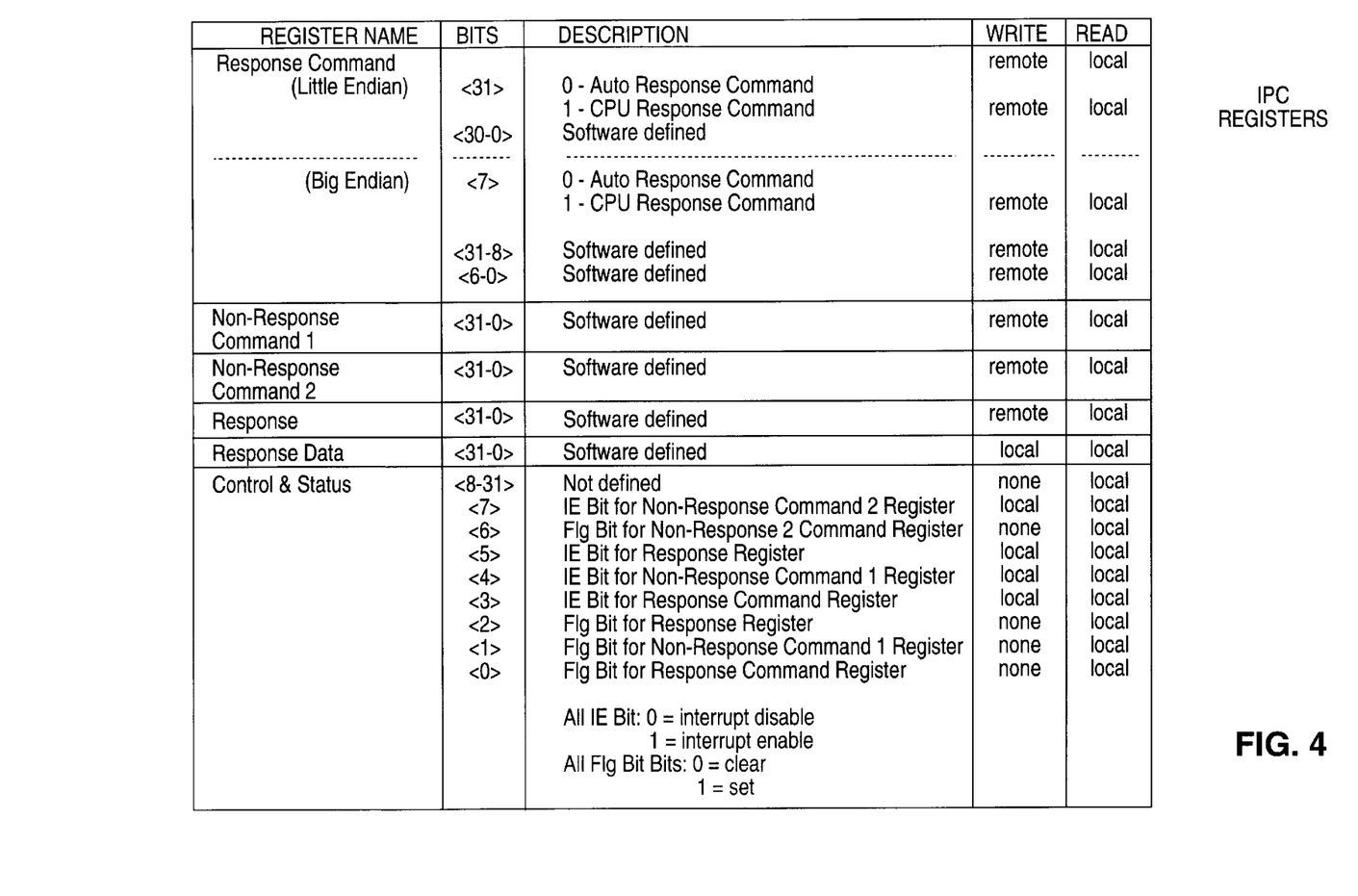
FIG. 4 illustrates an example of the register format of the various registers of IPC Comm Reg shown in FIG. 3.

FIG. 4 illustrates an example of the register format for the various registers of the IPC Comm Reg 50 and 60.

IPC Response Command

The IPC response command register 78 and 98 can be used in two ways: Auto-response method and CPU-response method, the response type selected being controlled through a pre-defined bit in the response command register CMD1 Reg (in this example, bit 31 for little-endian mode OR bit 7 for big-endian mode).

Auto-Response Command Mode

Figure 5:
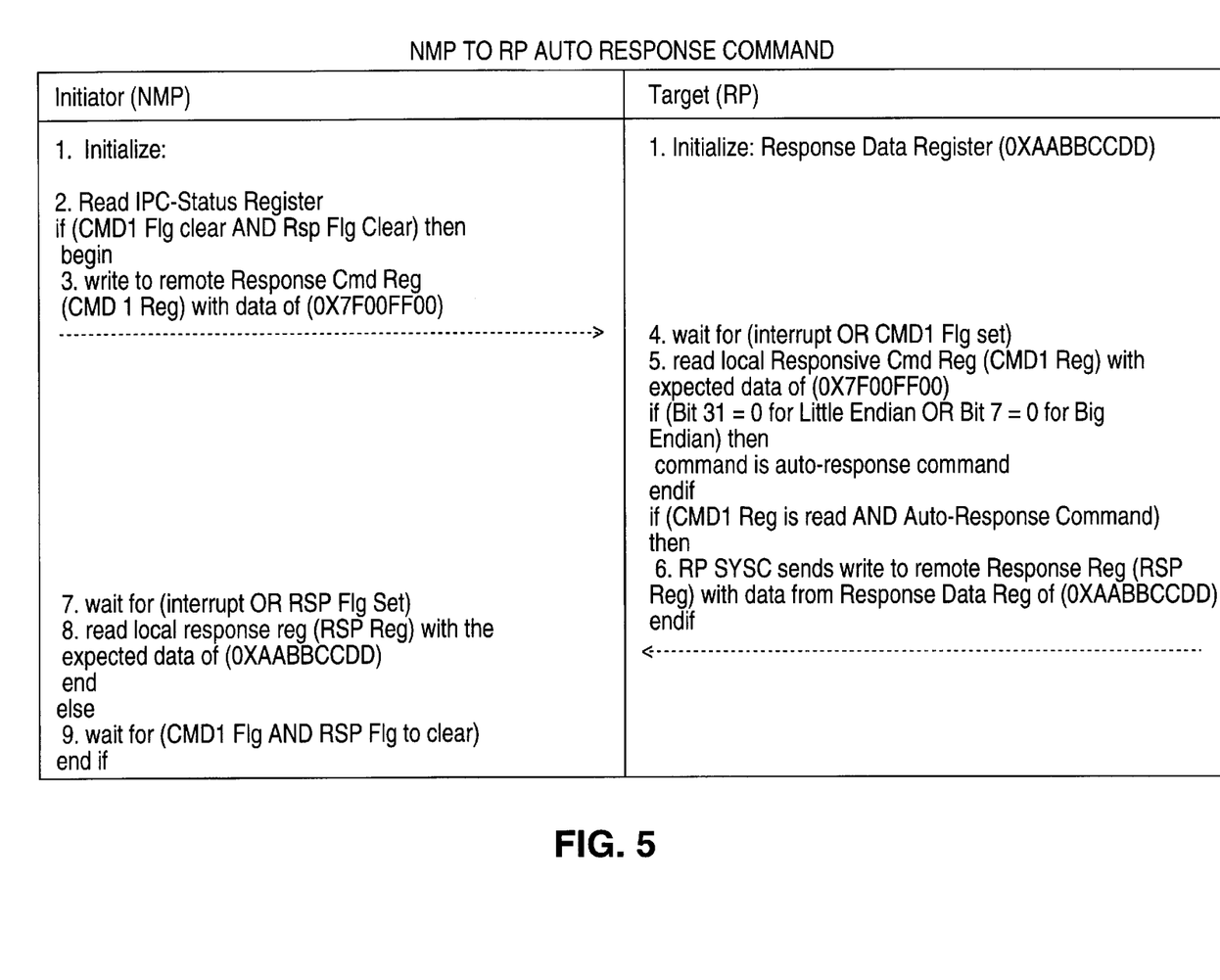
FIG. 5 illustrates an example of an inter-processor communication auto response command sequence using the inter-processor communication system of FIG. 3.

FIG. 5 illustrates an example of an auto-response command mode sequence of events from NMP processor to RP processor. In auto-response command mode, assuming NMP processor 32 is the initiating processor to start an inter-processor communication and RP processor 14 is the target processor, NMP IPC Comm Reg 60 writes an auto-response-command to the target CMD1 Reg, which in this case is RP response command register (CMD1 Reg) 74. Target SYSC 18 detects a write to its IPC Comm Reg 74 and sets the target write status flag (CMD1 flg), i.e., Control & Status Reg bit <0> of FIG. 4. Target RP processor 14 is then notified of the write either by target RP 14 polling on target SYSC status register 82, or by target SYSC 18 sending an interrupt signal to target RP 14 if the target IPC Comm Reg interrupt enable (IE) bit was set by the user. The IE bit associated with CMD1, CMD2, and RSP Reg is programmable to provide additional flexibility as needed by the user. Once target processor 14 reads response command register 74, target system controller 18 sends a response back to initiating processor 32 with data from its response data register 70. Describing NMP processor 32 in this example as the initiating processor and RP processor 14 as the target processor is done so merely as an illustration. It is contemplated that RP processor 14 could also be the initiating processor while NMP processor 32 is the target processor.

The auto-response command mode can be used when a pre-defined response is needed from the target processor or the target system controller. In this case, the target CPU does not have to send a specific response to the initiator. Possible uses for this command is route-table syncs.

CPU-Response Command Mode

Figure 6:
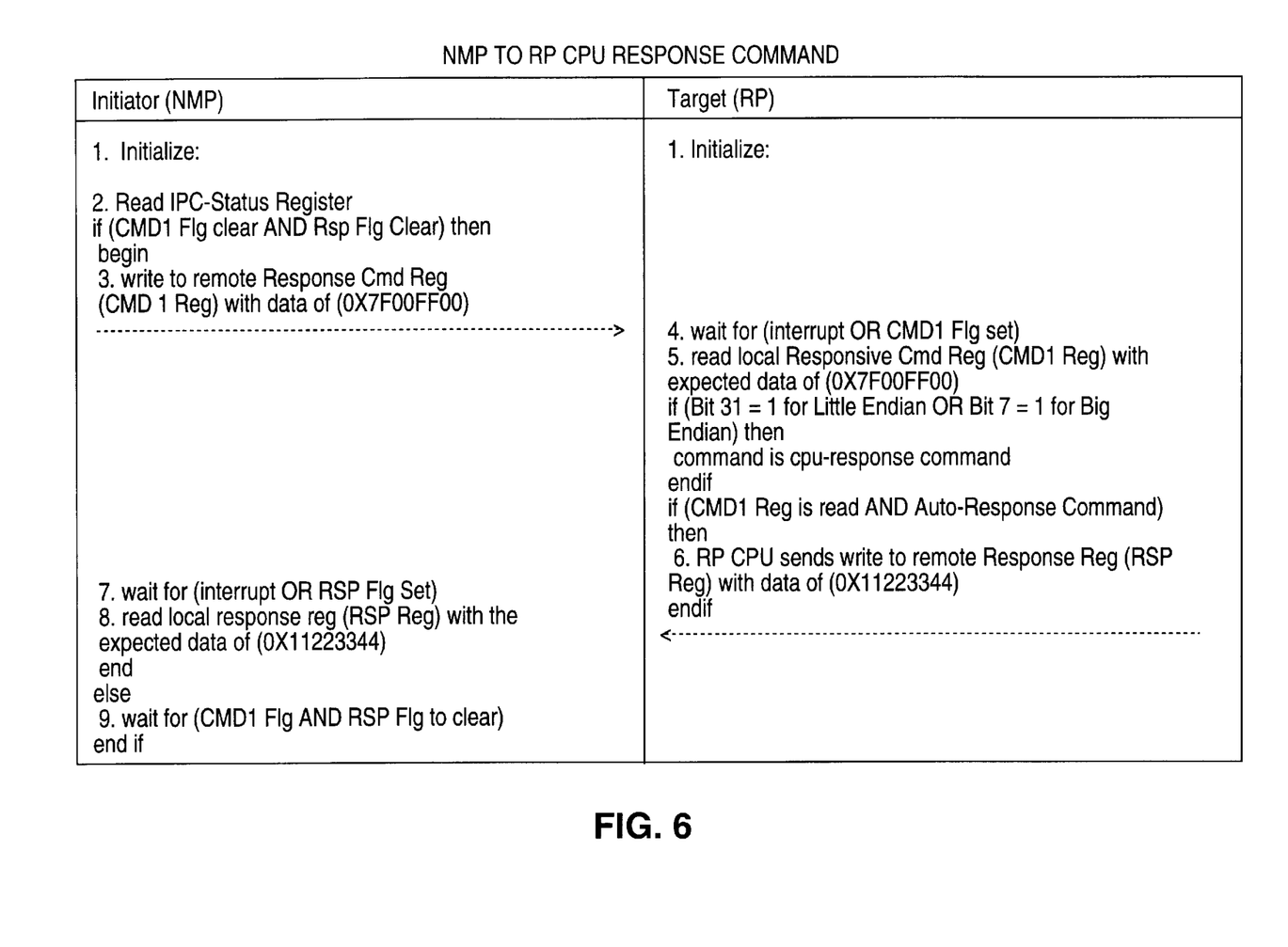
FIG. 6 illustrates an example of an inter-processor communication CPU response command sequence using the inter-processor communication system of FIG. 3.

FIG. 6 illustrates an example of a CPU-response command sequence. In this mode, the initiating processor sends a CPU-response command to the target processor. Thus, in this example, target processor 14 (see FIG. 3) reads its local response command register (CMD1 Reg) 74 and then target processor 14 sends a write to initiating processor's response register (RSP Reg) 98. The primary difference between this command and auto-response command is that the target CPU sends a specific write to the initiating response register 98 rather than the target SYSC. This command is used wherever more explicit synchronization and response is required such as flash-down loads, memory buffer allocation, etc.

Non Response Command Mode

Figure 7:
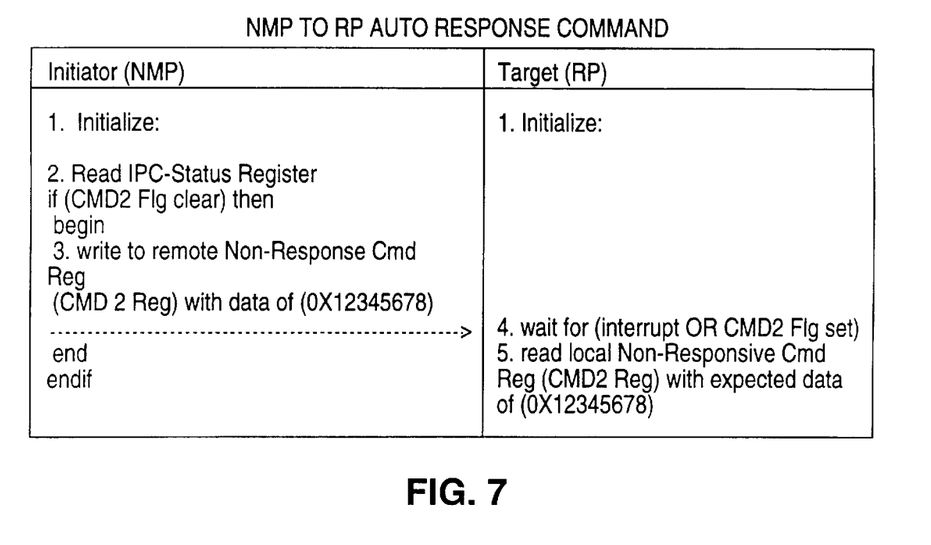
FIG. 7 illustrates another embodiment of an inter-processor communication non-response command sequence using the inter-processor communication system of FIG. 3.

FIG. 7 illustrates an example of a non-response command mode sequence. In this mode, the initiating processor 32 (see FIG. 3) sends a write to target's non-response command register (CMD2 Reg) 76. Target processor 14 receives the write data and needs not respond back to initiating processor 32. This command can be used to establish an inter-processor communication queue where multiple commands are sent by an initiating processor to the target processor.

IPC Auto Response State Machine

Figure 8:
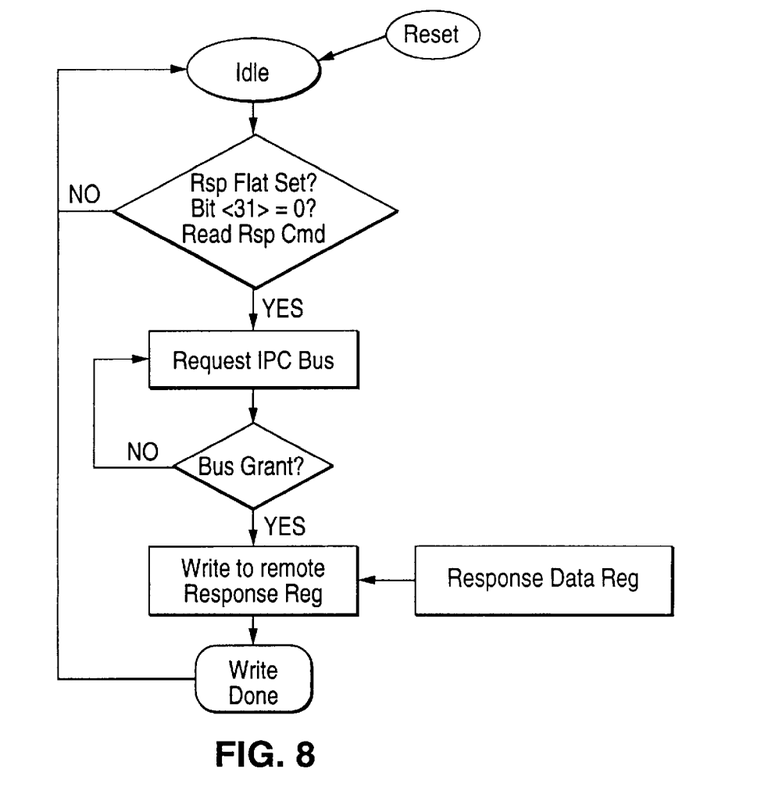
FIG. 8 illustrates an auto response state machine flow diagram for the state machine of FIG. 3.

FIG. 8 illustrates the preferred embodiment of an IPC auto response state machine for auto-state machine 72 and 92 of IPC Comm Reg 50 and 60, respectively. During auto-response command mode, IPC auto response state machine is responsible for sending the target response to the initiating processor or counter once the target processor performs a read on the target response command register and the command mode is auto-response type. FIG. 8 illustrates the flow diagram for the preferred state machine command sequence.

The inter-processor communication system and method of this invention thus provides reliable, real-time inter-processor communication between processors in a multi-processor environment as is needed for a variety of applications, such as during network management operation, during system reset conditions, or during certain network events. Inter-processor communication system and method described herein also provides sustained minimum data transfer bandwidth to meet system requirements at the network interface. This system and method also allows the processors to share certain processor memory location in a reliable and predictable way, as well as providing a flexible and programmable system and method to adapt to processor environment enhancements and additional requirements as demanded by the networking standards.

The foregoing described embodiments of the invention are provided as an illustration and description. It is not intended to limit the invention to the precise form described. Other variations and embodiments are possible in light of the above teaching, and it is thus intended that the scope of the invention not be limited by the detailed description, but rather by the claims as follow.

We claim:

1. An inter-processor communication method for communication between multiple processors comprising:

writing data by an initiating processor system controller coupled to an initiating processor to a remote target IPC Comm Reg of a remote target processor system controller;

detecting by the target system controller the write operation of the initiating system controller and setting an associated interrupt flag of the target IPC Comm Reg in response to that write operation; and detecting by a target processor the set interrupt flag in the target IPC Comm Reg, and in response thereto, reading data from the target IPC Comm Reg.

2. The inter-processor communication method of claim 1 further comprising:

writing response data by the target system controller to a response register of the initiating IPC Comm Reg;

detecting by the initiating system controller the writing of response data to the initiating IPC Comm Reg, and in response thereto, setting an interrupt flag of the initiating response register; and detecting by an initiating processor coupled to the initiating system controller the set interrupt flag of the initiating response register, and in response thereto, reading the response data in the initiating response register.

3. The inter-processor communication method of claim 1 further comprising the target system controller detecting the state of a mode bit of the target IPC Comm Reg is set, and in response thereto the target system controller writes data from a target response data register to the initiating response register.

4. The inter-processor communication method of claim 1 further comprising the target system controller detecting the state of a mode bit of the target IPC Comm Reg is set, and in response thereto a target processor coupled to the target system controller writes data from target response register to the initiating response register.

5. An inter-processor communication system for communication between multiple processors comprising:

for each processor, each processor coupled to a local processor system controller; and an inter-processor communication bus (IPC bus) coupled to each processor system controller to transmit inter-processor communication data from the processor system controller of one processor to the processor system controller of another processor;

each local processor system controller comprising an inter-processor communication register (IPC Comm Reg), each IPC Comm Reg further comprising:
   a response command register (CMD1 Reg);
   a non-response command register (CMD2 Reg); and
   a response register (RSP Reg):

wherein each IPC Comm Register is coupled to an associated local processor via a local processor bus and to one or more remote processors via the IPC bus so that a remote processor has remote write access to the local IPC Comm Register of the local system controller, while the local processor has read access of the local IPC Comm Register.

6. The inter-processor communication system of claim 5 wherein each processor system controller comprises an IPC control and status register to store a set of status control signals associated with the IPC Comm Register.

7. The inter-processor communication system of claim 5 wherein each set of IPC Comm Registers further comprises a response data register to store auto-response commands.

8. An inter-processor communication system between an initiating processor and a target processor comprising:

for each of the processors, each processor coupled to a processor system controller having an inter-processor communication registers (IPC Comm Reg), the IPC Comm Reg further comprising:
   a response command register (CMD1 Reg), the CMD1 Reg comprising an associated write status flag and an associated interrupt enable flag;
   a non-response command register (CMD2 Reg), the CMD2 Reg comprising an associated write status flag and an associated interrupt enable flag; and
   a response register (RSP Reg), the RSP Reg comprising an associated write status flag and an associated interrupt enable flag; and an inter-processor communication bus (IPC bus);

wherein the IPC Comm Reg of the initiating system controller and is coupled remotely to the IPC Comm Reg of the target system controller via the IPC bus so that one or more of the associated write status flags of the target IPC Comm Reg is cleared or set in response to a read or write operation of to the target IPC Comm Reg by the initiating processor.

9. The inter-processor communication system of claim 8 wherein for each IPC Comm Reg associated with each processors, each IPC Comm Reg further comprising:

a response data register for storing a set of response data; and an IPC control status register for storing a set of control status flags associated with the registers of the IPC Comm Reg.

10. The inter-processor communication system of claim 8 wherein for each IPC Comm Reg associated with each processors, each IPC Comm Reg further comprising an auto response state machine for storing auto response sequence commands for an auto response mode of the IPC Comm Reg.

11. An inter-processor communication method for communication between multiple processors comprising:

detecting by an initiating processor system controller coupled to an initiating processor the state of a write status flag of an initiating response command register associated with that initiating processor;

writing data by the initiating system controller to a remote target response command register in a remote target processor system controller;

detecting by the target system controller coupled to a target processor the write operation to the target response command register, and setting a target response command register interrupt flag in response to that write operation; and detecting by the target processor the target response command register interrupt flag, and in response thereto, reading data from the target response command register.

12. The inter-processor communication method of claim 11 further comprising:

writing response data by the target system controller to an initiating response register of the initiating system controller; and detecting the written response data by the initiating system controller and setting an interrupt flag associated with that initiating response register; and detecting that set interrupt flag of the initiating response register by the initiating processor, and in response thereto, reading the response data in the initiating response register.

13. The inter-processor communication method of claim 11 further comprising the target system controller detecting the state of a mode bit of the target IPC Comm Reg, and in response thereto, the target system controller writes data from a target response data register to the initiating response register.

14. The inter-processor communication method of claim 11 further comprising the target system controller detecting the state of a mode bit of the target IPC Comm Reg, and in response thereto a target processor coupled to the target system controller writes data from target response register to the initiating response register.

15. The inter-processor communication method of claim 11, wherein the step of detecting by the initiating processor system controller of the write status flag of the initiating response command register further comprises detecting a write status flag of an initiating response register.

16. An inter-processor communication method for communication between multiple processors comprising:

detecting by an initiating processor system controller coupled to an initiating processor the state of a write status flag of an initiating non-response command register associated with that initiating processor;

in response to the detected state of the write status flag, writing data by the initiating system controller to a remote target non-response command register in a remote target processor system controller;

detecting by the target system controller the write operation to the target non-response command register, and in response thereto, setting a target non-response command register interrupt flag; and detecting by a target processor coupled to the target system controller the target non-response command register interrupt flag, and in response thereto, reading data from the target non-response command register.

* * * * *